United States Patent [19]

Davis

[11] Patent Number: 5,103,795
[45] Date of Patent: Apr. 14, 1992

[54] AIR AND FUEL MIXING APPARATUS AND METHOD

[75] Inventor: Frank J. Davis, Riverdale, Ga.

[73] Assignee: Davis Family Trust, Atlanta, Ga.

[21] Appl. No.: 702,053

[22] Filed: May 17, 1991

[51] Int. Cl.$^5$ ............................................. F02B 43/00
[52] U.S. Cl. .................................... 123/527; 48/180.1
[58] Field of Search .................... 123/525, 527, 590; 48/180.1; 261/16, DIG. 39

[56] References Cited

U.S. PATENT DOCUMENTS

| 2,233,523 | 3/1941 | Forgar | 48/180.1 |
|---|---|---|---|
| 2,992,084 | 7/1961 | Schropp | 48/180.1 |
| 4,387,689 | 6/1983 | Brown | 123/525 |
| 4,398,521 | 8/1983 | Schuurman | 123/527 |
| 4,399,795 | 8/1983 | Brown | 123/527 |
| 4,425,140 | 1/1984 | Lassanske | 48/180 C |
| 4,425,898 | 1/1984 | McLean | 123/527 |
| 4,479,466 | 10/1984 | Greenway et al. | 123/527 |
| 4,494,515 | 1/1985 | Brown | 123/527 |
| 4,497,304 | 2/1985 | Wintrell et al. | 123/527 |
| 4,553,523 | 11/1985 | Stohrer | 126/9 B |
| 4,872,440 | 10/1989 | Green | 123/590 |

Primary Examiner—Noah P. Kamen
Attorney, Agent, or Firm—Kennedy & Kennedy

[57] ABSTRACT

An apparatus 10 for introducing a mixture of air and gaseous fuel into internal combustion engines has a housing 12 in communication with a supply of gaseous fuel that may be mounted to tubular intake ports 11 of the engine. The apparatus has a pair of control tubes 32 which adjustably extending into the housing to positions close to but spaced from the intake ports to form gaps therebetween. By repositioning the control tubes the size of these gaps may be altered to alter the air to gas mixture ratio.

3 Claims, 2 Drawing Sheets

AIR AND FUEL MIXING APPARATUS AND METHOD

TECHNICAL FIELD

This invention relates to apparatuses for introducing a mixture of air and gaseous fuel into internal combustion engines.

BACKGROUND OF THE INVENTION

The air pollution problems inherent in the operation of gasoline fueled and diesel oil fueled internal combustion engines are well known. For this reason various emission control devices are presently in use, and indeed are required by federal regulations, to reduce the amount of pollutants discharged into the atmosphere by internal combustion engines. These emission control devices, however, only remove a portion of the pollutants and are subject to deterioration with the passage of time. Also, they often hinder engines from operating at peak efficiencies.

Natural gas has been proposed as a substitute fuel for gasoline and diesel oil. It has the capability of producing less combustion pollutants and for decreasing engine operating costs without complex emission control devices. Obviously, its use would also reduce the rate of world fossil fuel consumption.

As the transportation infrastructure of today does not include large numbers of widely disbursed retail suppliers of natural gas for vehicles, it is not practical to produce vehicles that are fueled solely by gaseous fuels like natural gas due to range limitations. To evolve towards such it is more practical to equip vehicles with a supply of both a liquid fuel such as gasoline or diesel fuel and an auxiliary supply of gaseous fuel such as natural gas. To do that efficiently it is essential that as little retrofitting be done as possible to existing fuel intake systems and configurations.

Various devices have been developed for mixing natural gas and air for introduction into an engine. For example, conversion kits have been designed for installation onto carburetors. These kits provide a dual fuel system that permits operation of the engine on liquid fuel alone, on gaseous fuel alone, and in some systems on combinations of the two.

One type of such a kit provides a gaseous dispensing device mounted within an intake conduit that funnels air to the engine air filter. Exemplary of this type is that shown in U.S. Pat. No. 4,494,515. A problem associated with this type of kit is that original automobile parts must be modified in order to accommodate it. Once these modifications are made the modified part must be replaced or repaired, should the device be removed. Another problem associated with it is that the proper air to gas mixture is achieved through limiting the flow of gaseous fuel passing through the device into the engine air stream. This limitation results in limiting gas consumption rate throughout the entire range of gas flow rate needs.

Another type of kit achieves a proper mixture of gas and air by limiting the amount of air entering the carburetor. The mixture is adjusted by increasing or decreasing air flow by typically providing a movable plate which limits the spacing through which air entering the engine may flow. This limitation however results in limiting the performance of the engine. Exemplary of these types of devices are shown in U.S. Pat. Nos. 4,425,140, 4,425,898, and 4,387,689. Once again, these devices require modifications to be made to conventional parts of the automobile engine.

Accordingly, it is seen that an apparatus and method for mixing gaseous fuel and air together for introduction into an internal combustion engine without complex and costly modifications to the engine, and which may be easily adjustable so that the apparatus may be mounted to engines of different sized displacements, has long remained an elusive goal. Accordingly, it is to the provision of such that the present invention is primarily directed.

SUMMARY OF THE INVENTION

In one form of the invention, apparatus is provided for introducing gaseous fuel mixed with air into a tubular intake port of an internal combustion engine. The apparatus comprises a housing having a rear wall formed with a rear opening sized to receive the tubular intake port and a front wall formed with a front opening aligned with the rear opening. The apparatus also has a gas intake orifice, means for mounting the housing to the intake port, and a control tube sized to be inserted into the housing front opening. The control tube has an inside diameter in an end portion thereof less than the inside diameter of the engine intake port. Means are also included for adjustably securing the control tube substantially in place within the housing.

Upon mounting the housing to the intake port, inserting the control tube into the housing front opening and into a position with its end portion positioned closely adjacent to but spaced from the intake port, and introducing gaseous fuel into the housing through the gas intake orifice, an airstream passing through the control tube and into the intake port may create a drop in pressure as the airstream passes therebetween to draw gaseous fuel from the housing into the airstream through the spacing between the control tube end portion and the intake port. The flow rate of the gaseous fuel is adjustable by repositioning of the control tube within the housing so as to adjust the space between adjacent ends of the control tube and port within the housing.

In another form of the invention, a method is provided of controlling the mixture ratio of gaseous fuel and air introduced into an internal combustion engine tubular intake port of a selected size. The method comprises the steps of mounting a housing about an end portion of the intake port to which housing a stream of gaseous fuel may be supplied. The control tube is positioned in the housing in axial alignment with the tubular intake port with an end of the control tube at a position closely adjacent to the tubular intake port to form a gap therebetween. The control tube is secured in positions to control: the air to gaseous fuel mixture ratio by variations in the spacing between adjacent ends of the control tube and port.

DETAILED DESCRIPTION

Figure 1:
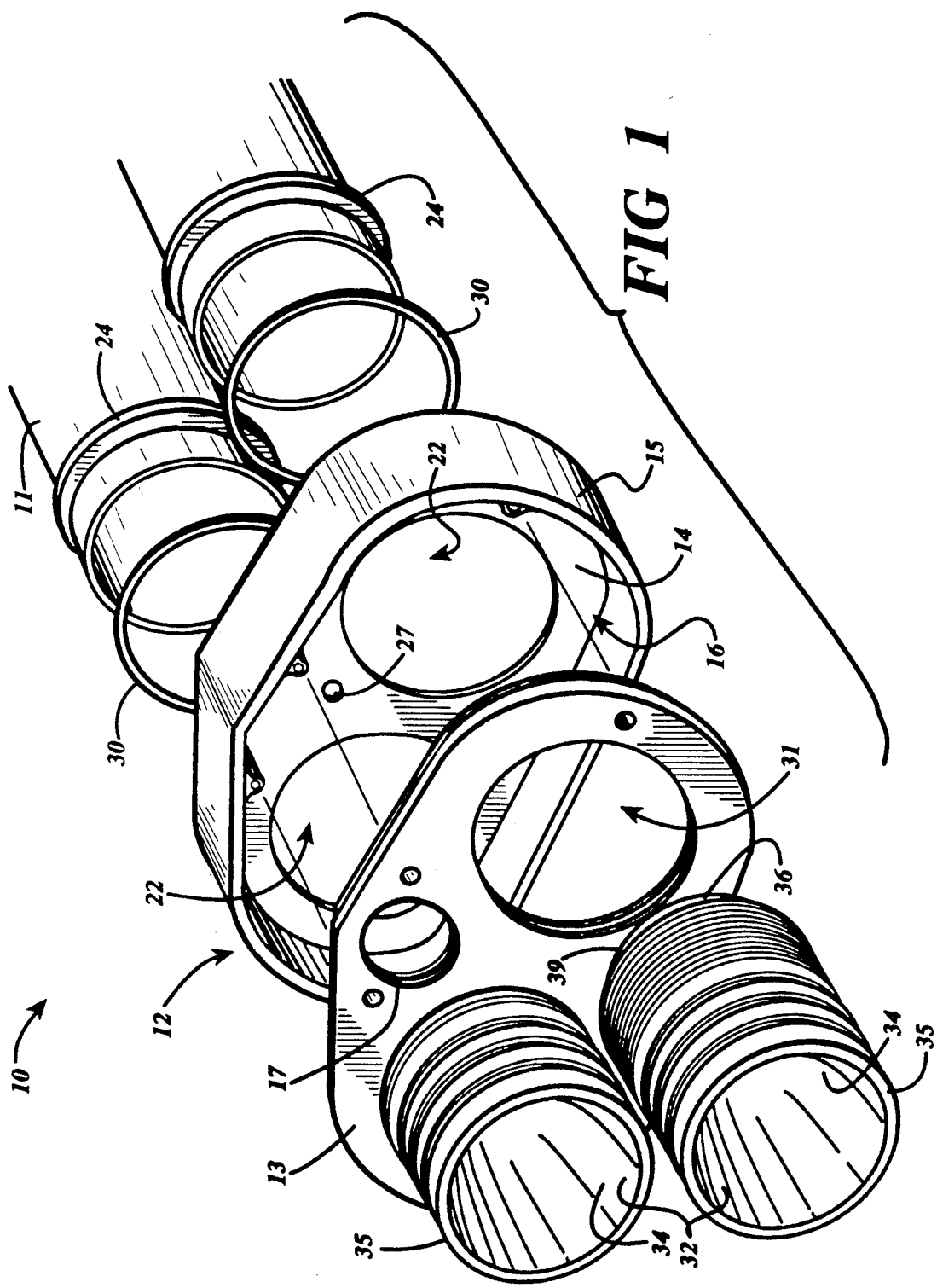
FIG. 1 is an exploded view of apparatus embodying principles of the present invention in a preferred form.
Figure 2:
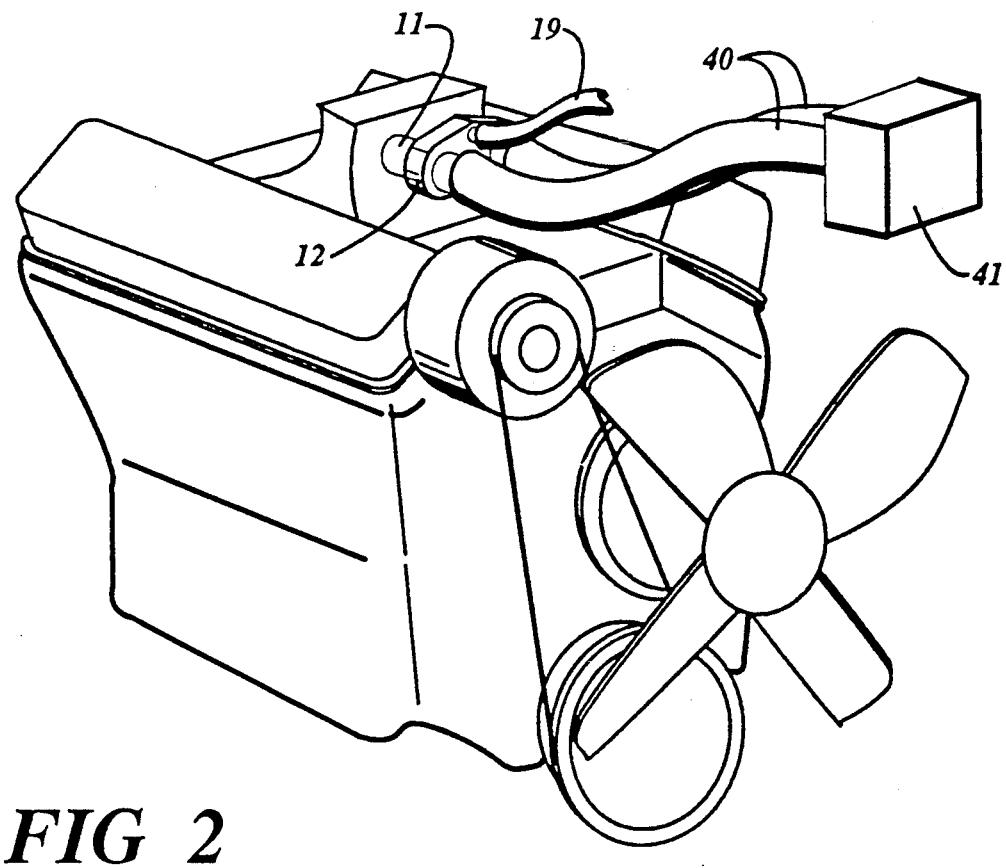
FIG. 2 is a perspective view of the apparatus of FIG. 1 shown mounted to an automobile vehicle internal combustion engine.
Figure 3:
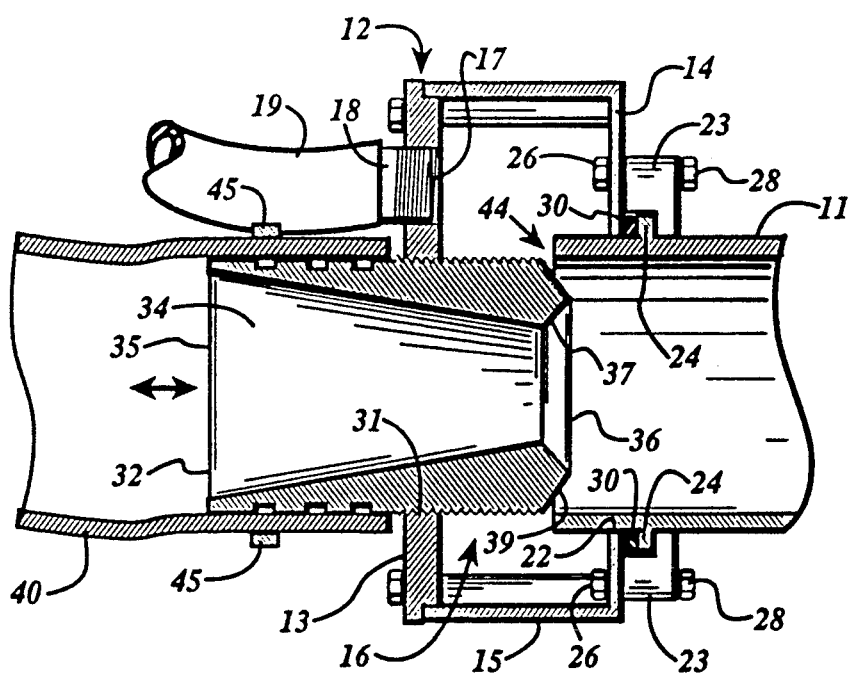
FIG. 3 is a cross-sectional view of the apparatus of FIG. 1.

With reference next to the drawing, there is shown an apparatus 10 for introducing gaseous fuel and air into two tubular intake ports 11 of a conventional fuel injection type automobile engine. As best shown in FIG. 3, the apparatus 10 includes a housing 12 having a front wall 13, a rear wall 14 and side walls 15 which partially defines a plenum 16. The housing front wall 13 has a threaded gas intake orifice 17 in which a coupler 18 mounted to a gaseous fuel supply line 19 is threaded through which gaseous fuel may be fed to the plenum 16.

The housing 12 is mounted to the intake ports 11 by sliding the housing over an end portion of the ports so as to cause them to extend into the housing through two housing rear openings 22. The housing is then secured in place with a pair of L-shaped brackets 23 mounted about annular port flanges 24. Each bracket has an unshown hole through which a mounting bolt 26 is passed and which also is passed through a housing mounting hole 27. The bolt is secured by a nut 28 with an O-ring 30 mounted on each intake port between the intake port flange 24 and the housing 12. The housing front wall 13 also has two internally threaded front openings 31 in axial alignment with its two rear openings 22 and the two intake ports 11.

The apparatus 10 has two externally threaded control tubes 32 which are threaded through the two front openings 31 of the housing which are also in axial alignment with the two rear openings 22 and the two intake ports 11. Each control tube 32 has an inside wall or bore 34 that tapers inwardly as it extends from one tube end 35 towards its other tube end 36. Each has a second, opposite interior taper or flare 37 in its end portion adjacent its end 36. The control tubes 32 also have an exterior end taper or flare 39 on their end portions about the opposite interior taper 37.

The apparatus 10 may be easily mounted to an existing automobile engine so that the engine may be fueled by a gaseous fuel or by liquid fuel that is conventionally injected. This is done by disconnecting the two air hoses 40 that extend from the engine air filter 41. An O-ring 30 is mounted onto an end of each intake port 11 in abutment with a port flange 24 that is ordinarily present. The housing 12 is mounted to the intake ports 11 and secured thereto by the two brackets 23. The control tubes 32 are then threaded into the housing front openings 31 until their ends 35 contact the ends of the intake ports 11. The gas line or hose 19, which extends from a tank of gaseous fuel such as natural gas or propane, is then mounted to the housing by coupler 18.

Next the apparatus is adjusted for peak efficiency, i.e. for the best gas to air mixture ratio. This may be done by rotating each control tube 32 in until their ends 35 abuts the ends of the intake port 11 and then rotatedly backing the control tube off one full turn. This can produce an annular gap 44 between the control tubes end 35 and the end of the intake ports of 1/32 inch, for example. The automobile engine is then started and the throttle set so that the engine operates at a constant speed such as 3,000 R.P.M. The control tubes are rotatably adjusted until the maximum R.P.M. level is reached which is indicative of the best fuel to air mixture ratio. The air hoses 40 extending from the air filter 41 are then telescopically placed about the control tube and secured by clamps 45 which hold them substantially in a fixed position with respect to the housing and the ports since the air hoses cannot usually be rotated significantly as by twisting.

In operation, natural gas flowing from a pressurized fuel tank is reduced to generally ambient pressure and controlled by a conventional pressure regulator. Once reduced to ambient pressure the gas passes through the coupled fuel line 19 and into the plenum 16. During operation of the engine the down or intake strokes of the pistons within the cylinders create negative air pressure within the engine which induces a flow of air into the engine through the intake ports 11. As this is done the interior taper 37, of the control tubes and the larger size of the ends of the ports 11 at the gaps between the ends of the ports and control tubes within the housing, create a pressure differentials which draws natural gas from the housing into the airstream flowing from the control tubes into the ports. In other words, the taper 34 causes the air flowing through the control tube to accelerate as it moves towards the control tube end 36. The interior terminal taper 37 and larger interior size of the ports allow the air flow to slow in this region thereby creating a drop in pressure adjacent the gap between the control tube and port which draws the gaseous fuel from the plenum 16 through the gap 44 and into the ports.

The control tube exterior flare 39 cooperate with the terminal interior taper or flare 37 to form a thorough and rapid entrainment of the natural gas into the airstream. The exterior taper also permits an end portion of the control tube to project actually slightly into the port. These geometrics combine to produce a swirling or eddying motion as the gaseous fuel stream collided with the airstream which causes the gaseous fuel to mix thoroughly with the air flow.

The angle of the exterior flare 39 also provides a finer degree of mixture adjustment for the flare provides a ratio between the measure of tube movement along its axis and the measure of spacing 33 formed between the exterior flare 39 and the intake port 11. For example, a movement of one inch along the tube axis may cause only a one half or one quarter inch change in the spacing 33. Therefore, very small changes in the spacing 33 may be achieved by advancements of the tube.

As the control tube 32 is adjusted towards the intake port the quantity of gaseous fuel entering the port is reduced proportionally to the reduction in the spacing 33 between the control tube 32 and the intake port 11. This reduction in the quantity of gaseous fuel produces a leaner air to fuel mixture. Conversely, as the control tube is adjusted away from the intake port the flow rate of gaseous fuel entering the port is increased proportionally to the increase in the spacing 33 to produce a richer mixture. Though the structure shown in the drawing is preferred, alternatively means may be employed for positioning the control tube such as, for example, the use of set screws.

From the foregoing it is seen that fuel mixing apparatus is now provided which overcomes problems associated with those of the prior art. Though it has been found to work well with natural gas, it may of course be used with other forms of gaseous fuel such as propane, methane and the like. Also, although the specific example described herein has been described in conjunction with its use on the intake port of a fuel injection system, it may also be used with other types of fumigating devices used or intended for use for the introduction of air or combustible fuel into internal combustion engines, including but not limited to carburetors, throttle body systems, or port injection systems. It will thus be understood that the present invention is operable not only with any and all fumigating devices, such as conventional fuel injection systems, for introducing air and combustible fuel into an internal combustion engine, but also with carburetors, throttle body systems, and port injection systems. It should however be understood that the just described embodiment merely illustrates principles of the invention in a preferred form. Many modifications, additions and deletions may, in addition to those expressly recited, be made without departure from the spirit and scope of the invention as set forth in the following claims.

I claim:

1. Apparatus for introducing gaseous fuel mixed with air into a tubular intake port of an internal combustion engine, an end portion of the intake port having a selected inside diameter, and with the apparatus comprising, in combination,
   a housing having a rear wall formed with a rear opening sized to receive the tubular intake port end portion, a front wall formed with a front opening aligned with said rear opening, and a gas intake orifice;
   means for mounting said housing to the intake port;
   a control tube sized to be inserted into said housing front opening, said control tube having a bore therethrough with a diameter in an end portion thereof less than the selected inside diameter of the engine intake port end portion and unit, said bore tapering inwardly towards said end portion and flaring outwardly at said tube end portion; and
   means for adjustably securing said control tube substantially in place within said housing;
   whereby upon mounting the housing to the intake port, inserting the control tube into the housing front opening and into a position with its end portion positioned closely adjacent to but spaced from the intake port end portion, and introducing gaseous fuel into the housing through the gas intake orifice, an airstream passing through the control tube and into the intake port may create a drop in pressure as the airstream passes therebetween to draw gaseous fuel from the housing into the airstream through the spacing between the control tube end portion and the intake port, the flow rate of the gaseous fuel being adjustable by repositioning of the control tube within the housing.

2. The apparatus of claim 1 wherein said control tube has an outside diameter generally equal to the intake port selected inside diameter, and wherein the outside of said control tube end portion flares inwardly so that an end portion of the control tube may project into the intake port whereby axial displacements of the control tube within the tubular intake port produce small changes in the size of the gap therebetween.

3. In an internal combustion engine of the type having a tubular intake port with an end portion of the intake port having a selected inside diameter, the improvement comprising means for introducing gaseous fuel and air into said intake port which comprises a housing mounted to said intake port with an end portion of said intake port located within said housing, fastening means for fastening said housing securely to said intake port, means through which gaseous fuel may be introduced into said housing, and a control tube mounted to said housing in substantial coaxial alignment with said intake port and with an end portion of said control tube located within said housing closely adjacent to and spaced from an end of said intake port, said control tube having a bore which tapers inwardly towards said control tube end portion and which tapers outwardly at said control tube end portion, and with said control tube end portion having an inside diameter less than the selected inside diameter of the engine intake port end portion, whereby an airstream passing through the control tube and into the intake port within the housing may create a pressure differential drawing gaseous fuel from the housing into the intake port between the confronting ends of the control tube and intake port.

* * * * *